United States Patent
Hitz et al.

(10) Patent No.: US 8,126,935 B2
(45) Date of Patent: Feb. 28, 2012

(54) SYSTEM AND METHOD FOR ENABLING A STORAGE SYSTEM TO SUPPORT MULTIPLE VOLUME FORMATS SIMULTANEOUSLY

(75) Inventors: David Hitz, Sunnyvale, CA (US); John K. Edwards, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/535,256

(22) Filed: Aug. 4, 2009

(65) Prior Publication Data
US 2009/0292748 A1 Nov. 26, 2009

Related U.S. Application Data

(63) Continuation of application No. 11/118,455, filed on Apr. 29, 2005, now Pat. No. 7,574,464.

(60) Provisional application No. 60/652,626, filed on Feb. 14, 2005.

(51) Int. Cl.
*G06F 17/30* (2006.01)
*G06F 7/00* (2006.01)

(52) U.S. Cl. ......... 707/803; 707/781; 707/812; 707/825

(58) Field of Classification Search ........................ None
See application file for complete search history.

(56) References Cited

U.S. PATENT DOCUMENTS
4,156,907 A     5/1979   Rawlings et al.
(Continued)

FOREIGN PATENT DOCUMENTS
WO       WO 89/10594       11/1989

OTHER PUBLICATIONS

Administration Guide found at http://www.openafs.org/pages/doc/AdminGuide/auagd010.htm, visited on Mar. 2, 2005.

(Continued)

*Primary Examiner* — Greta Robinson
*Assistant Examiner* — James J Wilcox
(74) *Attorney, Agent, or Firm* — Cesari and McKenna, LLP

(57) ABSTRACT

A plurality of types of volumes are maintained, a volume being a logical arrangement of storage space on one or more data storage devices. A volume type field is used to designate the type of a particular volume, and a flexible volume paradigm is selected by the volume type field for interpreting data within a data structure written to a data storage device of the one or more data storage devices. A physical volume block number to virtual volume block number mapping pair (pvbn/vvbn pair) is designated by the volume type field, the pvbn/vvbn pair is used to translate a physical volume block number to a virtual volume block number. A request to write a data to a first block of the particular volume is received, a pvbn/vvbn pair is determined. The data is written to the physical block designated by the pvbn/vvbn pair.

29 Claims, 9 Drawing Sheets

U.S. PATENT DOCUMENTS

| | | | |
|---|---|---|---|
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| 5,129,088 A * | 7/1992 | Auslander et al. | 711/1 |
| RE34,100 E | 10/1992 | Hartness | |
| 5,155,835 A | 10/1992 | Belsan | |
| 5,313,646 A * | 5/1994 | Hendricks et al. | 1/1 |
| 5,426,747 A | 6/1995 | Weinreb et al. | |
| 5,581,724 A | 12/1996 | Belsan et al. | |
| 5,819,292 A | 10/1998 | Hitz et al. | |
| 6,054,745 A * | 4/2000 | Nakos et al. | 257/415 |
| 6,119,118 A * | 9/2000 | Kain et al. | 707/822 |
| 6,195,761 B1 | 2/2001 | Kedem | |
| 6,233,696 B1 | 5/2001 | Kedem | |
| 6,260,110 B1* | 7/2001 | LeCrone et al. | 711/112 |
| 6,366,986 B1* | 4/2002 | St. Pierre et al. | 711/162 |
| 6,446,176 B1* | 9/2002 | West et al. | 711/162 |
| 6,542,975 B1* | 4/2003 | Evers et al. | 711/162 |
| 6,636,879 B1 | 10/2003 | Doucette et al. | |
| 6,654,772 B1 | 11/2003 | Crow et al. | |
| 6,681,303 B1* | 1/2004 | Watanabe et al. | 711/162 |
| 6,898,670 B2 | 5/2005 | Nahum | |
| 7,003,634 B2* | 2/2006 | Takeda et al. | 711/148 |
| 7,107,385 B2 | 9/2006 | Rajan et al. | |
| 7,243,207 B1* | 7/2007 | Prakash et al. | 711/202 |
| 7,376,796 B2 | 5/2008 | Corbett et al. | |
| 7,409,494 B2 | 8/2008 | Edwards et al. | |
| 7,430,571 B2 | 9/2008 | Edwards et al. | |
| 7,433,948 B2* | 10/2008 | Edsall et al. | 709/224 |
| 7,454,445 B2 | 11/2008 | Lewis et al. | |
| 7,574,464 B2 | 8/2009 | Hitz et al. | |
| 2002/0159178 A1* | 10/2002 | Yamamoto | 360/48 |
| 2002/0161983 A1* | 10/2002 | Milos et al. | 711/202 |
| 2003/0221076 A1* | 11/2003 | Milligan et al. | 711/165 |
| 2004/0022519 A1* | 2/2004 | Lee | 386/52 |
| 2004/0030668 A1 | 2/2004 | Pawlowski et al. | |
| 2004/0088507 A1* | 5/2004 | Satoyama et al. | 711/162 |
| 2005/0055497 A1* | 3/2005 | Estakhri et al. | 711/103 |
| 2005/0246401 A1* | 11/2005 | Edwards et al. | 707/205 |
| 2005/0246503 A1* | 11/2005 | Fair | 711/147 |
| 2006/0004684 A1* | 1/2006 | Kime | 707/1 |
| 2007/0124341 A1 | 5/2007 | Lango et al. | |

OTHER PUBLICATIONS

Basilico, et al., Error Correction System Using "Shadow Memory," IBM Technical Disclosure Bulletin, May 1984, pp. 5791-5793.

Bitton, Dina, Disk Shadowing, Proceedings of the 14th VLDB Conference, LA, CA (1988).

Blasgen, M.W. et al., System R: An architectural Overview, Reprinted from IBM Systems Journal vol. 20, No. 1, 1981© 1981, 1999.

Borenstein, Nathaniel S., CMU's Andrew project a retrospective, Communications of ACM, (39)12, Dec. 1996.

Brown, Mark R. et al., The Alpine file system, ACM Transactions on Computing Systems, 3(4):261-293, Nov. 1985.

Chen, Peter M., et al., An Evaluation of Redundant Arrays of Disks Using an Amdahl 5890 Performance Evaluation, pp. 74-85, 1990.

Chutani, Sailesh, et al., The Episode file system, in Proceedings of the USENIX Winter 1992.

Clark, B.E., et al., Application System /400 Performance Characteristics, IBM Systems Journal, 28(3): 407-423, 1989.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., A comparison of two distributed systems: Amoeba and Sprite—Computing Systems, 4(4), Fall 1991, pp. 353-385.

Gait, Jason, Phoenix: A Safe In-Memory File System. Communications of the ACM, 33(1):81-86, Jan. 1990.

Hartman, John H. et al., Performance Measurements of a Multiprocessor Sprite Kernel, Proceedings of the USENIX Conference, 1990.

Hitz, Dave et al., File System Design for an NFS File Server Appliance, Technical Report 3002, Rev. C395, presented Jan. 19, 1994.

Hitz, David, et al. System and Method for Enabling a Storage System to Support Multiple Volume Formats Simultaneously, USPTO U.S. Appl. No. 60/652,626. Feb. 14, 2005.

Howard, John H, et al. Scale and Performance in a Distributed File System, Carnegie Mellon University, CMU-ITC-87-068, Aug. 5, 1987.

Howard, John, H. et al., Scale and performance in a distributed file system, ACM Trans. Computer. System., 6(1), Feb. 1988 pp. 51-81.

Howard, John H., An Overview of the Andrew File System, Carnegie Mellon University, CMU-ITC-88-062.

The IBM System/38, Chapter 8, pp. 137-15.

Isomaki, Markus, Differentiated Service for the Internet, Department of Technical Physics and Mathematics, May 9, 1998.

Kazar, Michael L., et al., Decorum File System Architectural Overview, USENIX Summer Conference, Anaheim, California, 1990.

Lomet, David., et al., The performance of a multiversion access method, ACM SIGMOD International Conference on Management of Data, 19:353-363.

Lorie, Raymond, A, Physical integrity in a large segmented database, ACM Trans. Database Systems, (2)1:91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994.

Miller, Ethan L., et al., RAMA: A File System for Massively Parallel Computers, 12th IEEE Symposium on Mass Storage Systems, Monterey CA, Apr. 1993, pp. 163-168.

Moons, Herman et al., Location-Independent Object Invocation in Open Distributed Systems, Autumn 1991 EurOpen Technical Conference and Exhibition, pp. 287-300 (Sep. 16-20, 1991).

Morris, James H., et al, Andrew: A Distributed Personal Computing Environment, Comm. of the ACM, vol. 29, Mar. 1986, pp. 184-201.

Mullender, Sape J., et al., A distributed file service based on optimistic concurrency control, ACM Symposium on Operating System Principles (Orcas Island, Washington). Published as Operating Systems Review, 19(5):65-62, Dec. 1985.

Muller, Keith, et al., A High Performance Multi-Structured File System Design, in Proceedings of the 13th ACM Symposium on Operating Systems Principles, Oct. 1991, pp. 56-67.

Ousterhout, John K. et al., The Sprite Network Operating System, Computer Science Division, Department of Electrical Engineering and Computer Sciences, Univ. of CA, Berkley, Nov. 19, 1987.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Ousterhout, John, Why Aren't Operating Systems Getting Faster as Fast as Hardware?, Digital WRL Technical Note TN-11, Oct. 1989.

Ousterhout, John, A Brief Retrospective on the Sprite Network Operating System, found at http://www.cs.berkeley.edu/projects/sprite/retrospective.html,visited on Mar. 11, 2005.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., Stability in a Persistent Store Based on a Large Virtual Memory, in Security and Persistene, Rosenber, J. & Keedy, J.L. (ed), Springer-Verlag (1990) pp. 229-245.

Rosenblum, Mendel, et al., The LFS Storage Manager, Computer Science Division, Electrical Engin. and Computer Science, Univ. of CA, presented at Summer '90 USENIX Technical Conference, Anaheim, CA Jun. 1990.

Rosenblum, Mendel, et al., The Design and Implementation of a Log-Structured File System Jul. 24, 1991 pp. 1-15.

Rosenblum, Mendel, et al., The Design and Implementation of a Log-Structured File System, , in Proceedings of ACM Transactions on Computer Systems, (10)1:26-52, Feb. 1992.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, in Proceedings of the 10th ACM Symposium on Operating Systems Principles, (19)5:56-67, Dec. 1985.

Satyanarayanan,.M.. A survey of distributed file-systems. Annual Review of Computing Science, 4(73-104), 1989.

Satyanarayanan, M., et al, Coda: A highly available file system for a distributed workstation environment Carnegie Mellon University, CMU-ITC.

Satyanarayanan, M., et al, Coda: A highly available file system for a distributed workstation environment. IEEE Transactions on Computers, 39(4):447-459, 1990.

Satyanarayanan, Mahadev, Scalable, Secure, and Highly Available Distributed File Access, Computer May 1990: 9-21.

Sidebotham, Bob, Volumes: The Andrew File System Data Structuring Primitive, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., Pseudo Devices: User-Level Extensions to the Sprite File System, Computer Science Division, Department of Electrical Engineering and Computer Sciences, Univ. of CA, Berkley, Apr. 1988.

Welch, Brent B., et al., Pseudo-File-Systems, Computer Science Division, Department of Electrical Engineering and Computer Sciences, Univ. of CA, Berkley, Oct. 1989.

Wittle, Mark, et al, Laddis: The next generation in NFS file server benchmarking, USENIX Association Conference Proceedings, Apr. 1993.

"Notification of Transmittal of the International Search Report and the Written Opinion of the International Searching Authority, or the Declaration", mailed Aug. 18, 2006, International Application No. PCT/US2006/004943, 11 pages.

* cited by examiner

SYSTEM AND METHOD FOR ENABLING A STORAGE SYSTEM TO SUPPORT MULTIPLE VOLUME FORMATS SIMULTANEOUSLY

CROSS-REFERENCE TO RELATED APPLICATIONS

The present application claims the benefit of U.S. patent application Ser. No. 11/118,455, filed on Apr. 29, 2005, now issued as U.S. Pat. No. 7,574,464 on Aug. 11, 2009, which claimed the benefit of U.S. Provisional Patent Application Ser. No. 60/652,626, which was filed on Feb. 14, 2005, by David Hitz et al. for a SYSTEM AND METHOD FOR ENABLING A STORAGE SYSTEM TO SUPPORT MULTIPLE VOLUME FORMATS SIMULTANEOUSLY and is hereby incorporated by reference.

FIELD OF THE INVENTION

The present invention relates to storage systems and, more specifically, to storage systems that support multiple volume formats simultaneously.

BACKGROUND INFORMATION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configure to store striped data (i.e., data disks) and disks configure to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n−1, for a file system of size n blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configure to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

The storage system may be configure to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

When accessing a block of a file in response to servicing a client request, the file system specifies a vbn that is translated at the file system/RAID system boundary into a disk block number (dbn) location on a particular disk (disk, dbn) within a RAID group of the physical volume. It should be noted that a client request is typically directed to a specific file block number (fbn), which represents an offset into a particular file. For example, if a file system is using 4 KB blocks, fbn 6 of a file represents a block of data starting 24 KB into the file and extending to 28 KB, where fbn 7 begins. The fbn is converted to an appropriate vbn by the file system. Each block in the vbn space and in the dbn space is typically fixed, e.g., 4 k bytes (kB), in size; accordingly, there is typically a one-to-one mapping between the information stored on the disks in the dbn space and the information organized by the file system in the vbn space. The (disk, dbn) location specified by the RAID system is further translated by a disk driver system of the storage operating system into a plurality of sectors (e.g., a 4 kB block with a RAID header translates to 8 or 9 disk sectors of 512 or 520 bytes) on the specified disk.

The requested block is then retrieved from disk and stored in a buffer cache of the memory as part of a buffer tree of the file. The buffer tree is an internal representation of blocks for a file stored in the buffer cache and maintained by the file system. Broadly stated, the buffer tree has an inode at the root (top-level) of the file. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a vbn to facilitate efficiency among the file system and the RAID system when accessing the data on disks.

The RAID system maintains information about the geometry of the underlying physical disks (e.g., the number of blocks in each disk) in raid labels stored on the disks. The RAID system provides the disk geometry information to the file system for use when creating and maintaining the vbn-to-disk, dbn mappings used to perform write allocation operations and to translate vbns to disk locations for read operations. Block allocation data structures, such as an active map, a snapmap, a space map and a summary map, are data structures that describe block usage within the file system, such as the write-anywhere file system. These mapping data structures are independent of the geometry and are used by a write allocator of the file system as existing infrastructure for the logical volume. Examples of the block allocation data structures are described in U.S. Pat. No. 7,454,445, titled WRITE ALLOCATION BASED ON STORAGE SYSTEM MAP AND SNAPSHOT, by Blake Lewis et al, and issued on Nov. 18, 2008, which is hereby incorporated by reference.

The write-anywhere file system typically performs write allocation of blocks in a logical volume in response to an event in the file system (e.g., dirtying of the blocks in a file). When write allocating, the file system uses the block allocation data structures to select free blocks within its vbn space to which to write the dirty blocks. The selected blocks are generally in the same positions along the disks for each RAID group (i.e., within a stripe) so as to optimize use of the parity disks. Stripes of positional blocks may vary among other RAID groups to, e.g., allow overlapping of parity update operations. When write allocating, the file system traverses a small portion of each disk (corresponding to a few blocks in depth within each disk) to essentially "lay down" a plurality of stripes per RAID group. In particular, the file system chooses vbns that are on the same stripe per RAID group during write allocation using the vbn-to-disk, dbn mappings.

The on-disk structure of the file system is comprised of a number of entities of discrete data structures organized with appropriate pointers to layers beneath one entity. A storage system may utilize one physical volume, wherein the volume comprises of a number of physical disks associated in an arrangement, such as a RAID group for improved data protection. The physical volume utilizes physical volume block numbers (pvbns) within indirect blocks and inodes to point to other data structures within the on-disk structure of the file system.

FIG. 1 is a schematic block diagram of an exemplary on-disk storage arrangement 100 of a conventional physical volume of a file system. The on-disk storage arrangement 100 comprises a volinfo block 102 that contains pointers to various fsinfo blocks including fsinfo block 105 representing the active file system, as well as fsinfo blocks 110 and 115 representing various snapshots, or persistent consistency point images (PCPIs) associated with the active file system. It should be noted that "snapshot" is a trademark of Network Appliance, Inc. and is used for purposes of this patent to designate a persistent consistency point (CP) image. A PCPI is a space conservative, point-in-time read-only image of data accessible by name that provides a consistent image of that data (such as a storage system) at some previous time. More particularly, a PCPI is a point-in-time representation of a storage element, such as an active file system, volume, virtual file system, file or database, stored on a storage device (e.g., on disk) or other persistent memory and having a name or other identifier that distinguishes it from other PCPIs taken at other points in time. A PCPI can also include other information (metadata) about the active file system at the particular point in time for which the image is taken. The terms "PCPI" and "snapshot" may be used interchangeably through out this patent without derogation of Network Appliance's trademark rights.

The volinfo 102 is illustratively located at vbns 1 and 2 or, in alternate embodiments, at another predetermined location on disk. Each fsinfo block 105, 110, 115 is illustratively contained within an fsinfo file, the contents of which comprise the fsinfo block. In this example, the fsinfo block 105 for the active file system includes the inodes of the inode file for the active file system 120. The inode file for the active file system 120 includes further inodes for an active map 125, a summary map 130, a space map 135, a root directory 140 and a hidden metadata directory 145. Each additional fsinfo block, for example, fsinfo blocks 110 and 115, that is associated with a PCPI includes the inode of the inode file for the PCPI, which in turn includes appropriate inodes for active maps and the like (not shown) for the specific PCPI.

Other possible on-disk structures may be used with a storage system. For example, a volume may be modified so as to comprise an aggregate having a plurality of virtual volumes therein. Aggregates and virtual volumes are further described in U.S. Pat. No. 7,409,494, issued on Aug. 5, 2008, entitled Extension to a File System Write Layout, by John K. Edwards, et al. In such a storage system, the file system utilizes and interprets pointers contained within the various on-disk structures, including the volume information and fsinfo blocks according to a predetermined virtual volume format. However, there exists no adequate technique for permitting a storage system to support volumes having different formats simultaneously. That is, the storage system is typically "hard-coded" to utilize one type of volume format and to utilize a differing format, all volumes associated with the storage system need to be modified. Thus, if a storage system utilizes a conventional physical volume and a set of disks comprising an aggregate are connected thereto, the storage system will incorrectly interpret the data contained within the aggregate's disks due to the differing format of pointers contained therein.

SUMMARY OF THE INVENTION

The present invention overcomes the disadvantages of the prior art by providing a system and method for enabling a storage system to support multiple volume formats simultaneously. In the illustrative embodiment, a volume type field is added to a file system information (fsinfo) block that forms a top level of a volume or other data container. The volume type field holds a type volume that identifies the appropriate type of volume. By examining the fsinfo block when the volume is initially mounted on the storage system, a file system executing on the storage system may interpret correctly other data within the on-disk structure, including, e.g., the format of pointers within the volume.

Specifically, the file system utilizes the type value stored in the type field of the FS info block to identify the appropriate type of volume and to interpret the data contained therein correctly. In alternate embodiments, however, the type field may be stored in other predetermined locations, e.g. within a memory of the storage system or may be utilized to identify differing formats. In the illustrated embodiment, the type field differentiates between a conventional volume and a flexible volume comprising an aggregate having one or more virtual volumes contained therein.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Network Environment

Figure 2:
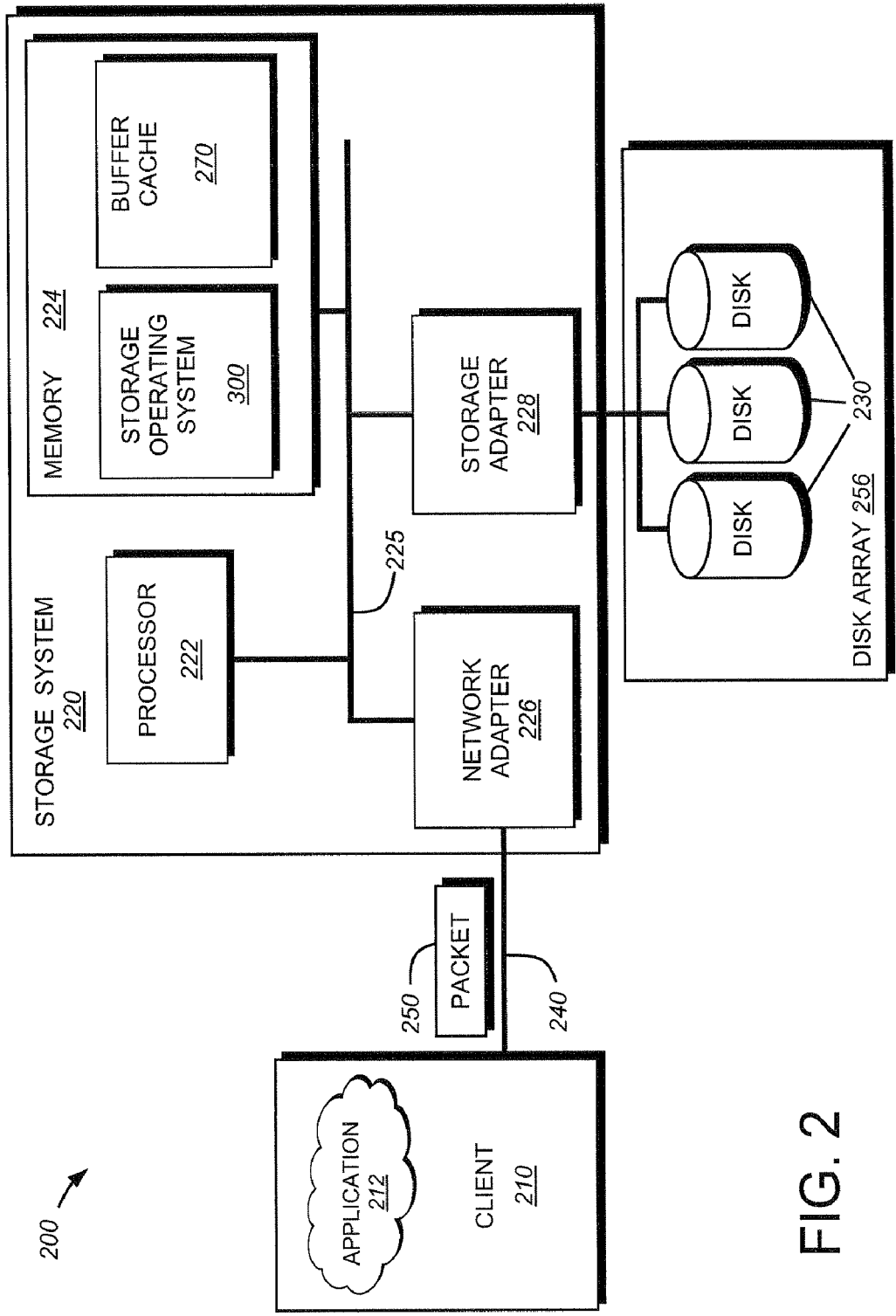
FIG. 2 is a schematic block diagram of an exemplary storage system in accordance with an embodiment of the present invention.

FIG. 2 is a schematic block diagram of an environment 200 including a storage system 220 that may be advantageously used with the present invention. The storage system is a computer that provides storage service relating to the organization of information on storage devices, such as disks 230 of a disk array 256. The storage system 220 comprises a processor 222, a memory 224, a network adapter 226 and a storage adapter 228 interconnected by a system bus 225. The storage system 220 also includes a storage operating system 300 that preferably implements a high-level module, such as a file system, to logically organize the information as a hierarchical structure of directories, files and special types of files called virtual disks (hereinafter "blocks") on the disks.

In the illustrative embodiment, the memory 224 comprises storage locations that are addressable by the processor and adapters for storing software program code. A portion of the memory may be further organized as a "buffer cache" 270 for storing certain data structures associated with the present invention. The processor and adapters may, in turn, comprise processing elements and/or logic circuitry configured to execute the software code and manipulate the data structures. Storage operating system 300, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The network adapter 226 comprises the mechanical, electrical and signaling circuitry needed to connect the storage system 220 to a client 210 over a computer network 240, which may comprise a point-to-point connection or a shared medium, such as a local area network (LAN) or wide area network (WAN). Illustratively, the computer network 240 may be embodied as an Ethernet network or a Fibre Channel (FC) network. The client 210 may communicate with the storage system over network 240 by exchanging discrete frames or packets of data according to pre-defined protocols, such as the Transmission Control Protocol/Internet Protocol (TCP/IP).

The client 210 may be a general-purpose computer configured to execute applications 112. Moreover, the client 210 may interact with the storage system 220 in accordance with a client/server model of information delivery. That is, the client may request the services of the storage system, and the system may return the results of the services requested by the client, by exchanging packets 250 over the network 240. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 228 cooperates with the storage operating system 300 executing on the system 220 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 256. The storage adapter includes input/output (I/O) interface circuitry that couples to the disks over an I/O interconnect arrangement, such as a conventional high-performance, FC serial link topology.

Storage of information on array 256 may be illustratively implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 230, the storage operating system 300 implements a write-anywhere file system that cooperates with virtualization modules to "virtualize" the storage space provided by disks 230. The file system logically organizes the information as a hierarchical structure of named directories and files on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 3:
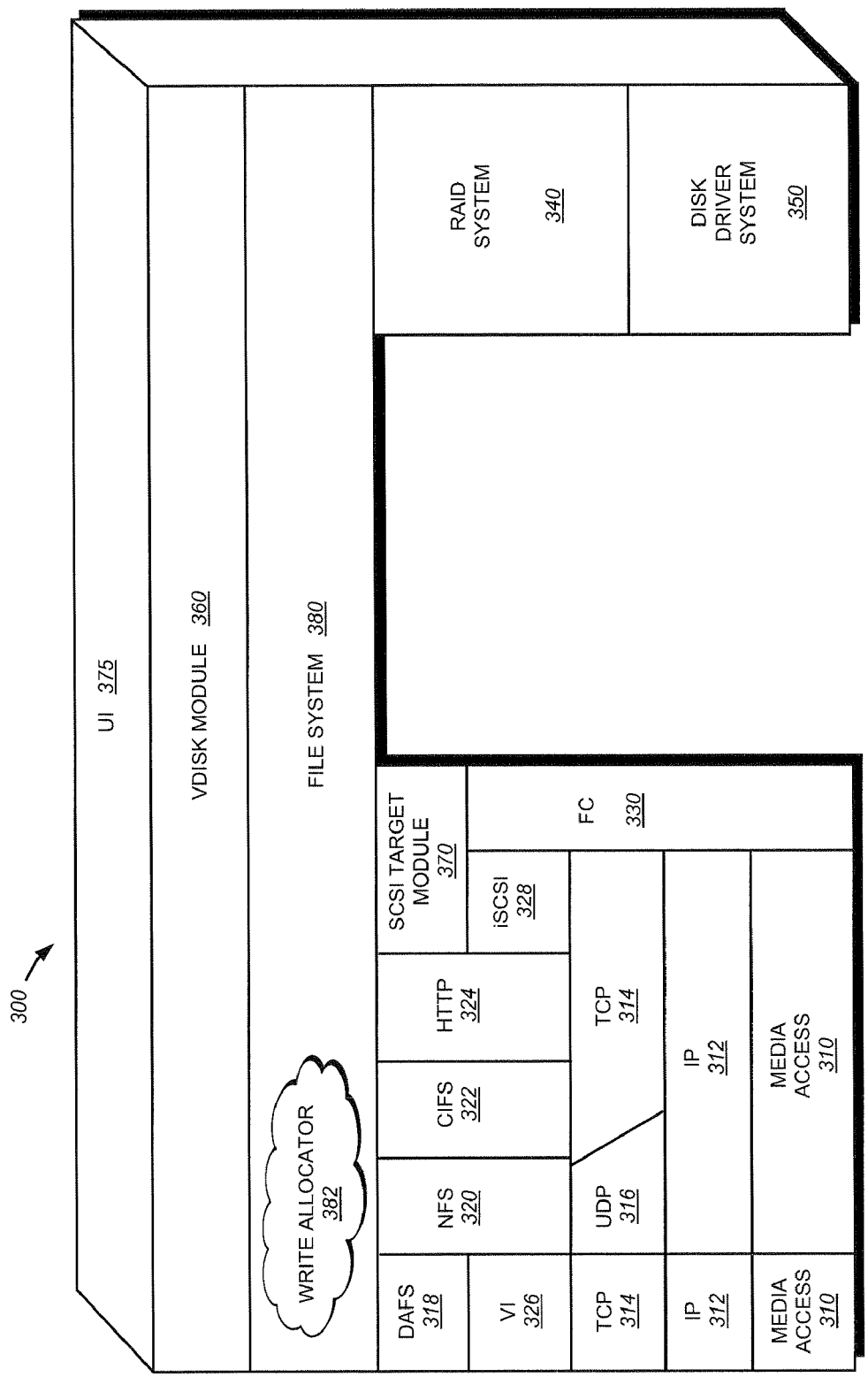
FIG. 3 is a schematic block diagram of an exemplary storage operating system in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 340 that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system that is implemented by a file system 380 interacting with virtualization modules illustratively embodied as, e.g., vdisk module 360 and SCSI target module 370. The vdisk module 360 is layered on the file system 380 to enable access by administrative interfaces, such as a user interface (UI) 375, in response to a user (system administrator) issuing commands to the storage system. The SCSI target module 370 is disposed between the FC and iSCSI drivers 328, 330 and the file system 380 to provide a translation layer of the virtualization system between the block (lun) space and the file system space, where luns are represented as blocks. The UI 375 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 380 provides functions normally associated with a volume manager. These functions include (i) aggregation of the disks, (ii) aggregation of storage bandwidth of the disks, and (iii) reliability guarantees, such as mirroring and/or parity (RAID). The file system 380 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 210 is forwarded as a packet 250 over the computer network 240 and onto the storage system 220 where it is received at the network adapter 226. A network driver (of layer 310 or layer 330) processes the packet and, if appropriate, passes it on to a network protocol and file access layer for additional processing prior to forwarding to the write-anywhere file system 380. Here, the file system generates operations to load (retrieve) the requested data from disk 230 if it is not resident "in core", i.e., in the buffer cache 270. If the information is not in the cache, the file system 380 indexes into the inode file using the inode number to access an appropriate entry and retrieve a logical vbn. The file system then passes a message structure including the logical vbn to the RAID system 340; the logical vbn is mapped to a disk identifier and disk block number (disk, dbn) and sent to an appropriate driver (e.g., SCSI) of the disk driver system 350. The disk driver accesses the dbn from the specified disk 230 and loads the requested data block(s) in buffer cache 270 for processing by the storage system. Upon completion of the request, the storage system (and operating system) returns a reply to the client 210 over the network 240.

It should be further noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 220 in response to a request issued by client 210. Moreover, in another alternate embodiment of the invention, the processing elements of adapters 226, 228 may be configure to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or storage appliance) or general-purpose computer, including a standalone computer or portion thereof, embodied as or including a storage system 220. An example of a multi-protocol storage appliance that may be advantageously used with the present invention is described in U.S. Pat. No. 7,873,700 titled MULTI-PROTOCOL STORAGE APPLIANCE THAT PROVIDES INTEGRATED SUPPORT FOR FILE AND BLOCK ACCESS PROTOCOLS, issued on Jan. 18, 2011. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 4:
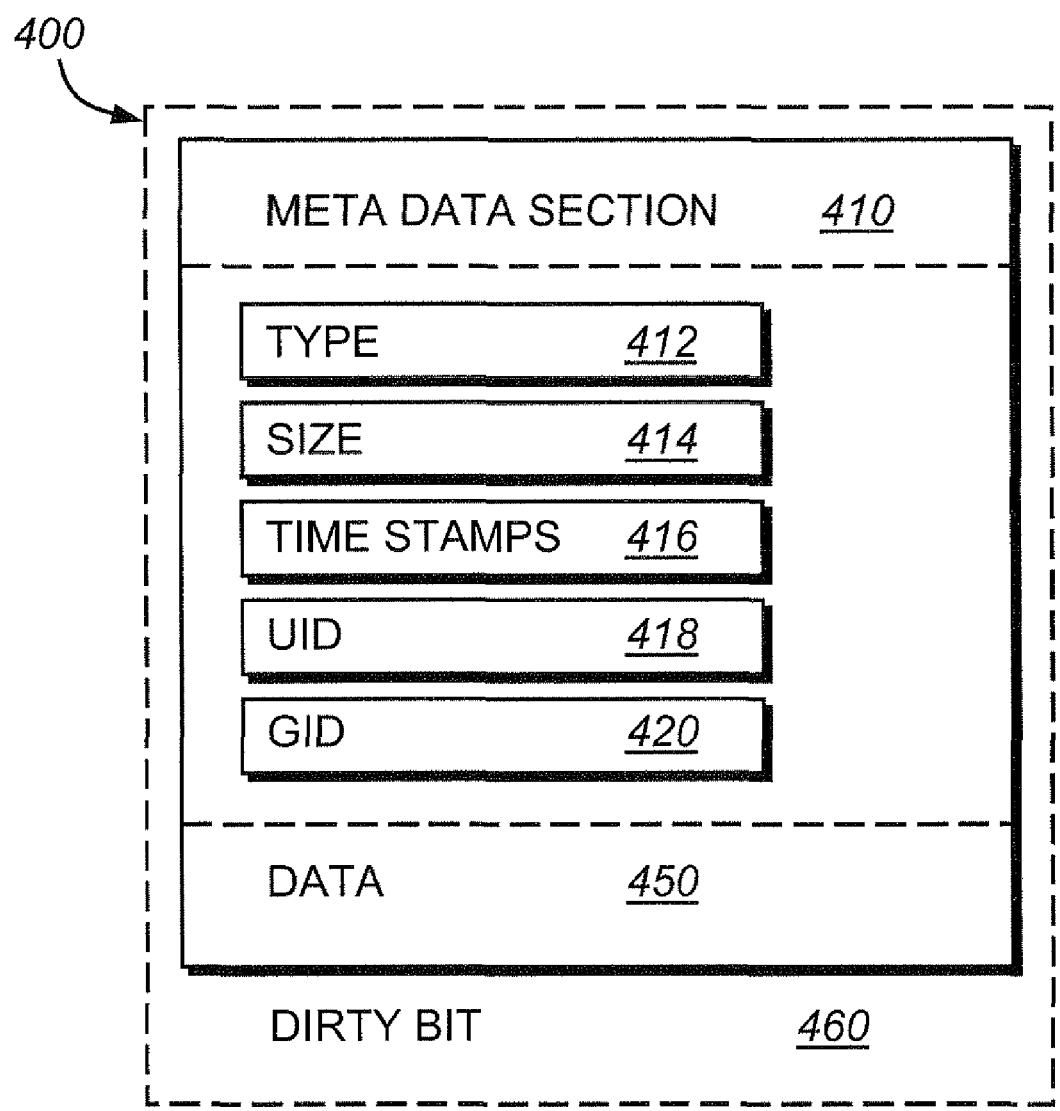
FIG. 4 is a schematic block diagram of an exemplary inode in accordance with an embodiment of the present invention.

In the illustrative embodiment, a file is represented in the write-anywhere file system as an inode data structure adapted for storage on the disks 230. FIG. 4 is a schematic block diagram of an inode 400, which preferably includes a metadata section 410 and a data section 450. The information stored in the metadata section 410 of each inode 400 describes the file and, as such, includes the type (e.g., regular, directory, virtual disk) 412 of file, the size 414 of the file, time stamps (e.g., access and/or modification) 416 for the file and ownership, i.e., user identifier (UID 418) and group ID (GID 420), of the file. The contents of the data section 450 of each inode, however, may be interpreted differently depending upon the type of file (inode) defined within the type field 412. For example, the data section 450 of a directory inode contains metadata controlled by the file system, whereas the data section of a regular inode contains file system data. In this latter case, the data section 450 includes a representation of the data associated with the file.

Specifically, the data section 450 of a regular on-disk inode may include file system data or pointers, the latter referencing 4 kilobyte (KB) data blocks on disk used to store the file system data. Each pointer is preferably a logical vbn to facilitate efficiency among the file system and the RAID system 340 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 450 of the inode (e.g., a second level inode) references an indirect block (e.g., a first level block) that contains 1024 pointers, each of which references a 4 KB data block on disk. For file system data having a size greater than 64 MB, each pointer in the data section 450 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 230 into the buffer cache 270.

When an on-disk inode (or block) is loaded from disk 230 into buffer cache 270, its corresponding in core structure embeds the on-disk structure. For example, the dotted line surrounding the inode 400 (FIG. 4) indicates the in core representation of the on-disk inode structure. The in-core structure is a block of memory that stores the on-disk structure plus additional information needed to manage data in the memory (but not on disk). The additional information may include, e.g., a "dirty" bit 460. After data in the inode (or block) is updated/modified as instructed by, e.g., a write operation, the modified data is marked "dirty" using the dirty bit 460 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 5:
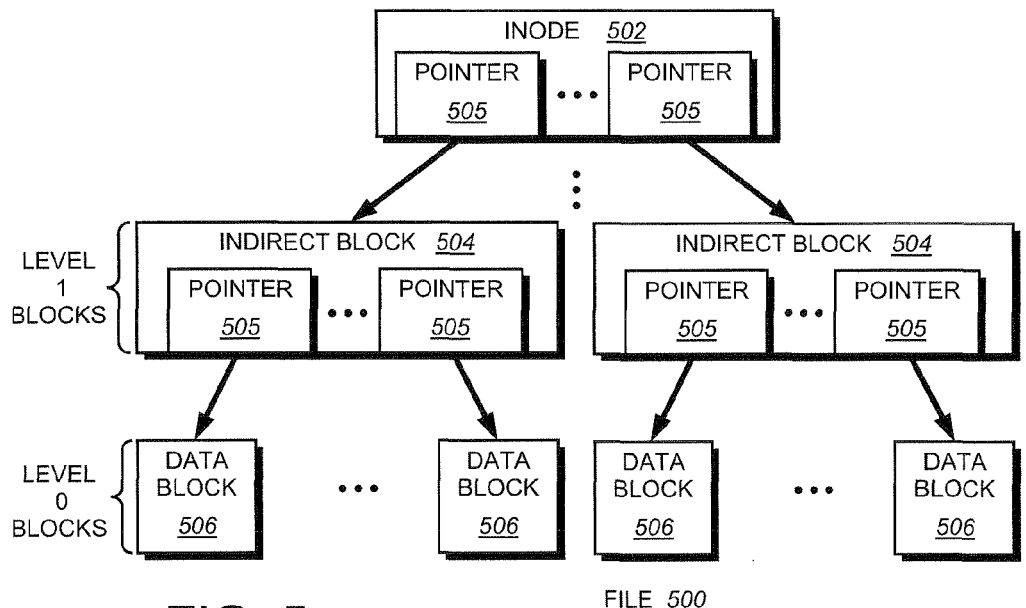
FIG. 5 is a schematic block diagram of an exemplary buffer tree data structure showing pointers in accordance with an embodiment of the present invention.

FIG. 5 is a schematic block diagram of an embodiment of a buffer tree of a file that may be advantageously used with the present invention. The buffer tree is an internal representation of blocks for a file (e.g., file 500) loaded into the buffer cache 270 and maintained by the write-anywhere file system 380. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pointers 505 that ultimately reference data blocks 506 used to store the actual data of the file. That is, the data of file 500 are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 230.

Figure 1:
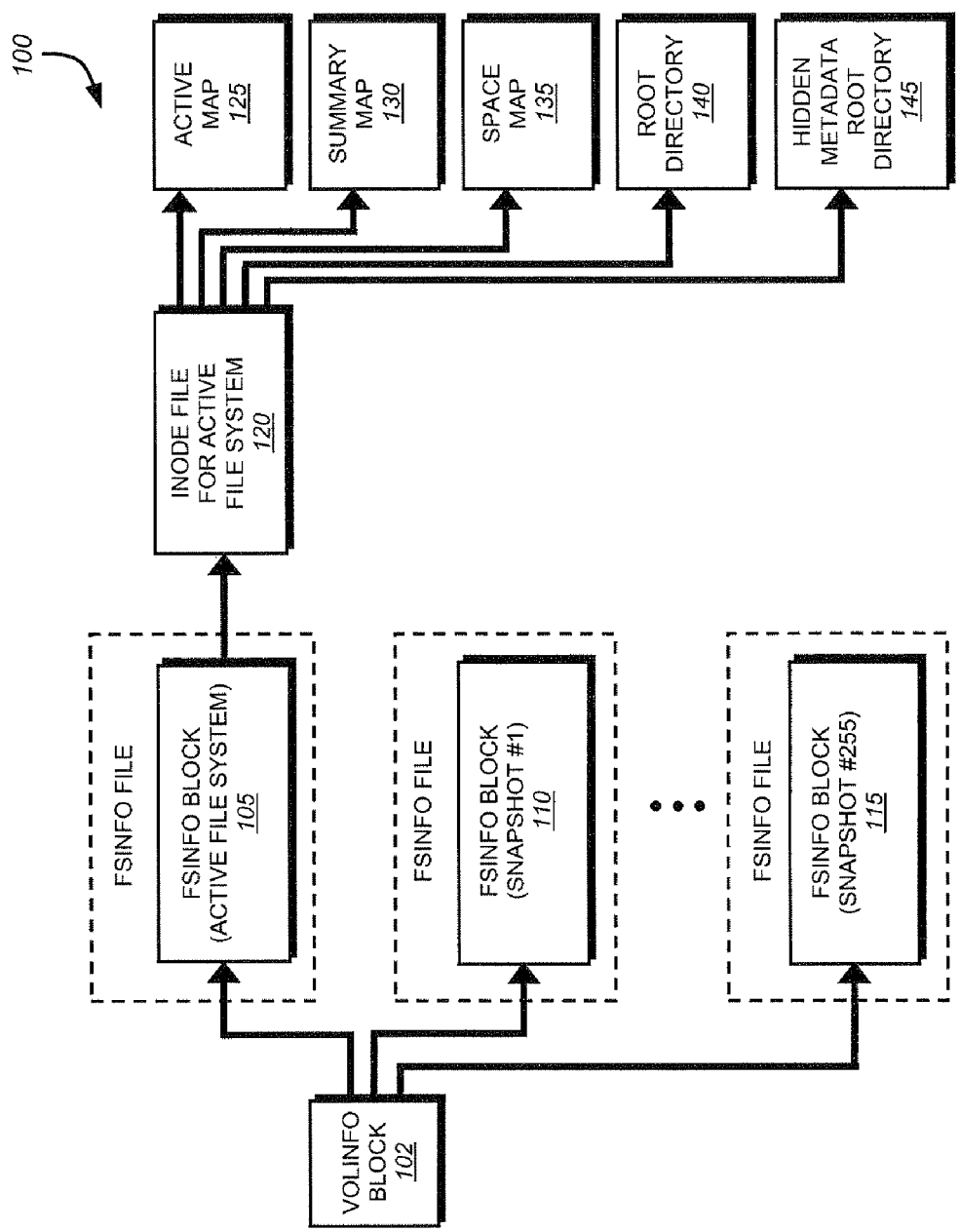
FIG. 1, already described, is a schematic block diagram of an exemplary on-disk structure of a physical volume in accordance with an embodiment of the present invention.

As noted above, the present invention permits multiple volume formats may be utilized in conjunction with a storage system simultaneously. FIGS. 1 and 5 describe an on-disk layout of a conventional physical volume. An alternate volume format that apportions an underlying physical volume into one or more virtual volumes (vvols) of a storage system is described in the above referenced U.S. Pat. No. 7,409,494 titled EXTENSION OF WRITE ANYWHERE FILE SYSTEM LAYOUT, by John K. Edwards et al. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 500) stored in a vvol. This "hybrid" vvol embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, "points to" an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk, dbn occurs at the file system/RAID system boundary of the storage operating system 300.

Figure 6:
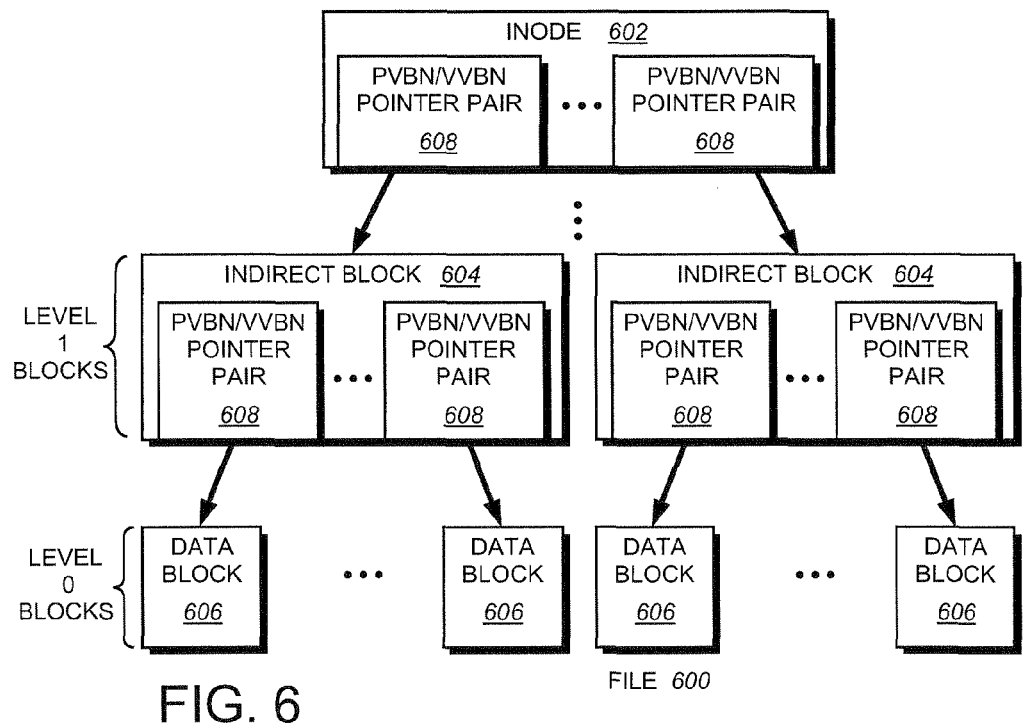
FIG. 6 is a schematic block diagram of an exemplary buffer tree data structure showing pointer pairs in accordance with an embodiment of the present invention.

In an illustrative "dual vbn" hybrid ("flexible") vvol embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 6 is a schematic block diagram of an illustrative embodiment of a buffer tree of a file 600 that may be advantageously used with the present invention. A root (top-level) inode 602, such as an embedded inode, references indirect (e.g., level 1) blocks 604. Note that there may be additional levels of indirect blocks (e.g., level 2, level 3) depending upon the size of the file. The indirect blocks (and inode) contain pvbn/vvbn pointer pair structures 608 that ultimately reference data blocks 606 used to store the actual data of the file.

The pvbns reference locations on disks of the aggregate, whereas the vvbns reference locations within files of the vvol. The use of pvbns as block pointers 608 in the indirect blocks 604 provides efficiencies in the read paths, while the use of vvbn block pointers provides efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

As noted, each inode has 64 bytes in its data section that, depending upon the size of the inode file (e.g., greater than 64 bytes of data), function as block pointers to other blocks. For traditional and hybrid volumes, those 64 bytes are embodied as 16 block pointers, i.e., sixteen (16) 4 byte block pointers. For the illustrative dual vbn flexible volume, the 64 bytes of an inode are embodied as eight (8) pairs of 4 byte block pointers, wherein each pair is a vvbn/pvbn pair. In addition, each indirect block of a traditional or hybrid volume may contain up to 1024 (pvbn) pointers; each indirect block of a dual vbn flexible volume, however, has a maximum of 510 (pvbn/vvbn) pairs of pointers.

Figure 7:
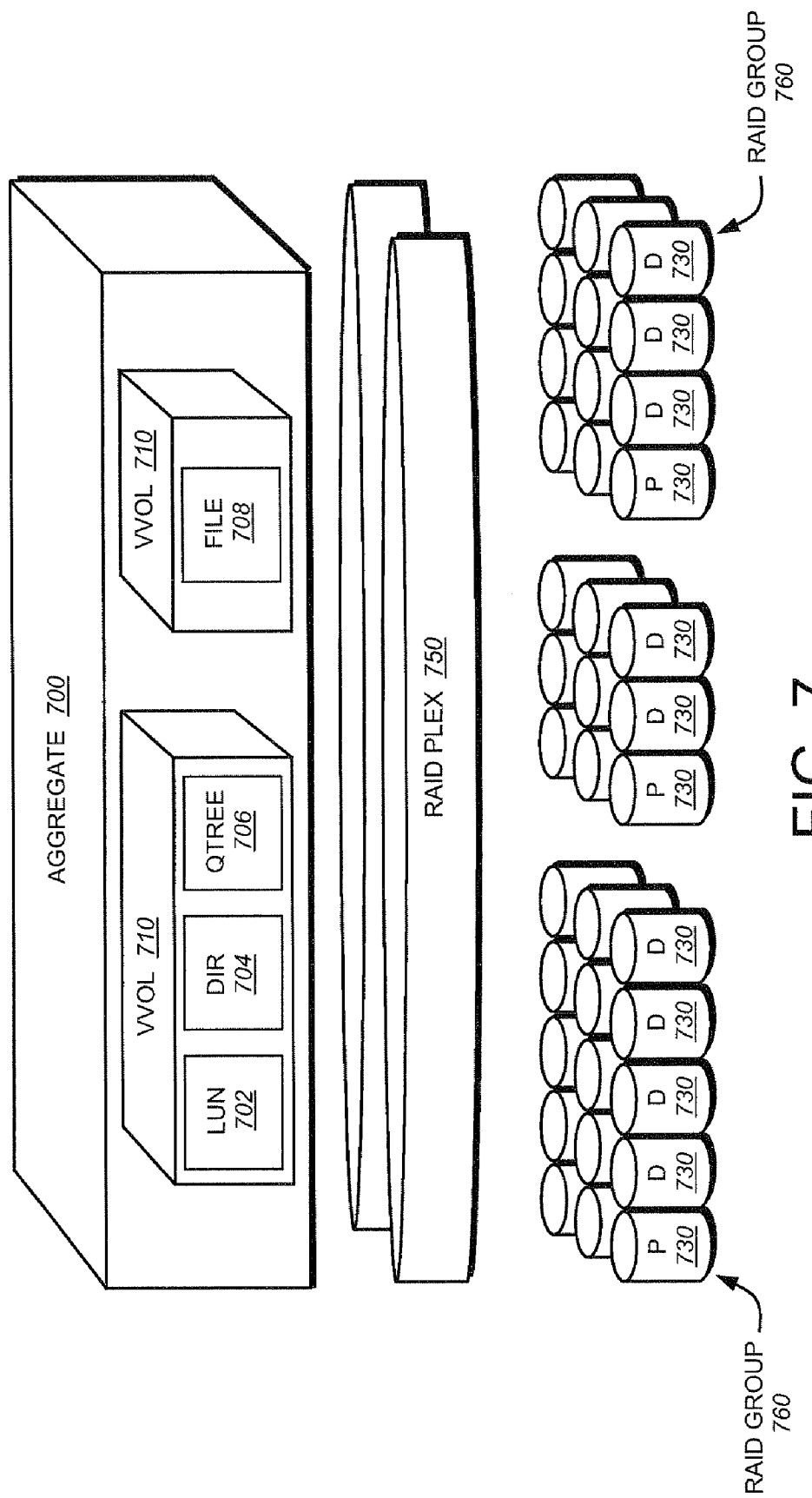
FIG. 7 is a schematic block diagram of an exemplary aggregate in accordance with an embodiment of the present invention.

FIG. 7 is a schematic block diagram of an embodiment of an aggregate 700 that may be advantageously used with the present invention. Luns (blocks) 702, directories 704, qtrees 706 and files 708 may be contained within vvols 710, such as dual vbn flexible vvols, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and at least one (P) parity disk.

Whereas the aggregate 700 is analogous to a physical volume of a conventional storage system, a vvol is analogous to a file within that physical volume. That is, the aggregate 700 may include one or more files, wherein each file contains a vvol 710 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 710 is also a logical volume, it has its own block allocation structures (e.g., active, space and summary maps) in its vvbn space.

A container file is a file in the aggregate that contains all blocks used by a vvol. The container file is an internal (to the aggregate) feature that supports a vvol; illustratively, there is one container file per vvol. Similar to the pure logical volume in a file approach, the container file is a hidden file (not accessible to a user) in the aggregate that holds every block in use by the vvol. The aggregate includes an illustrative hidden metadata root directory that contains subdirectories of vvols:

WAFL/fsid/filesystem file, storage label file

Specifically, a "physical" file system (WAFL) directory includes a subdirectory for each vvol in the aggregate, with the name of subdirectory being a file system identifier (fsid) of the vvol. Each fsid subdirectory (vvol) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

Figure 8:
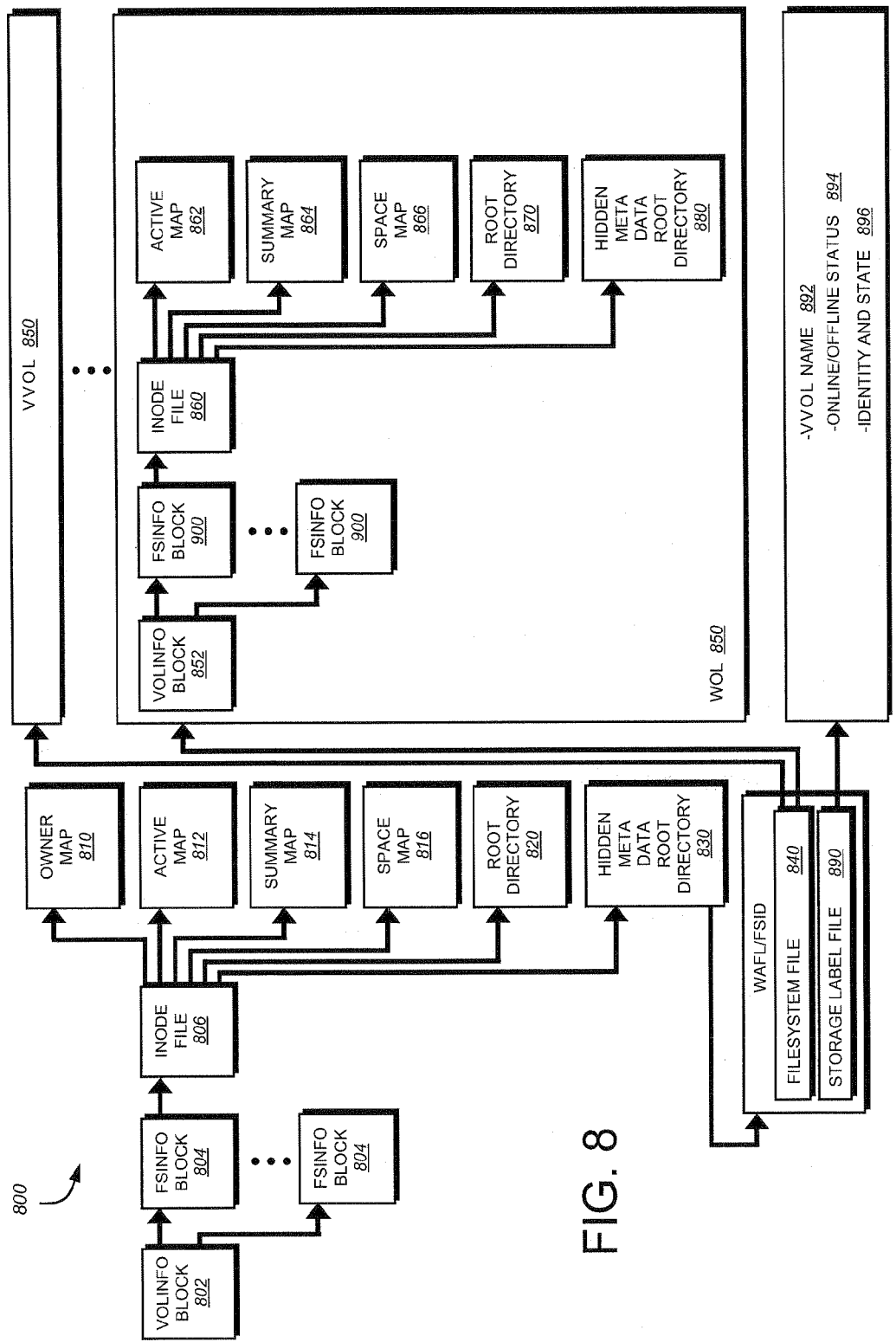
FIG. 8 is a schematic block diagram of an exemplary on-disk.

FIG. 8 is a schematic block diagram of an on-disk representation of an aggregate 800. The storage operating system 300, e.g., the RAID system 340, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. Each fsinfo block 804 includes a block pointer to an inode file 806 that contains inodes of a plurality of files, including an owner map 810, an active map 812, a summary map 814 and a space map 816, as well as other special metadata files. The inode file 806 further includes a root directory 820 and a "hidden" metadata root directory 830, the latter of which includes a namespace having files related to a vvol in which users cannot "see" the files. The hidden metadata root directory also includes the WAFL/fsid/directory structure that contains filesystem file 840 and storage label file 890. Note that root directory 820 in the aggregate is empty; all files related to the aggregate are organized within the hidden metadata root directory 830.

In addition to being embodied as a container file having level 1 blocks organized as a container map, the filesystem file 840 includes block pointers that reference various file systems embodied as vvols 850. The aggregate 800 maintains these vvols 850 at special reserved inode numbers. Each vvol 850 also has special reserved inode numbers within its vvol space that are used for, among other things, the block allocation bitmap structures. As noted, the block allocation bitmap structures, e.g., active map 862, summary map 864 and space map 866, are located in each vvol.

Specifically, each vvol 850 has the same inode file structure/content as the aggregate, with the exception that there is no owner map and no WAFL/fsid/filesystem file, storage label file directory structure in a hidden metadata root directory. To that end, each vvol 850 has a volinfo block 852 that points to one or more fsinfo blocks 900, each of which may represent a snapshot, along with the active file system of the vvol. Each fsinfo block, in turn, points to an inode file 860 that, as noted, has the same inode structure/content as the aggregate with the exceptions noted above. Each vvol 850 has its own inode file 860 and distinct inode space with corresponding inode numbers, as well as its own root (fsid) directory 870 and subdirectories of files that can be exported separately from other vvols.

As noted, the storage label file 890 contained within the hidden metadata root directory 830 of the aggregate is a small file that functions as an analog to a conventional raid label. A raid label includes "physical" information about the storage system, such as the volume name; that information is loaded into the storage label file 890. Illustratively, the storage label file 890 includes the name 892 of the associated vvol 850, the online/offline status 894 of the vvol, and other identity and state information 896 of the associated vvol (whether it is in the process of being created or destroyed).

An example of a write allocation procedure that may be advantageously used with the present invention is described in U.S. Pat. No. 7,430,571 titled, EXTENSION OF WRITE ANYWHERE FILE LAYOUT WRITE ALLOCATION, by John K. Edwards, which application is hereby incorporated by reference. Broadly stated, block allocation proceeds in parallel on the flexible vvol and aggregate when write allocating a block within the vvol, with a write allocator process 282 selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid (vvol identifier) of the vvol and the vvbn are inserted into owner map 710 of the aggregate at an entry defined by the selected pvbn. The selected pvbn is also inserted into a container map (not shown) of the destination vvol. Finally, an indirect block or inode file parent of the allocated block is updated with one or more block pointers to the allocated block. The content of the update operation depends on the vvol embodiment. For a dual vbn hybrid vvol embodiment, both the pvbn and vvbn are inserted in the indirect block or inode as block pointers.

D. Supporting Multiple Volume Formats on a Storage Appliance

The present invention provides a system and method for enabling a storage system to support multiple volume formats simultaneously. In the illustrative embodiment, an on-disk structure e.g. an fsinfo block, is modified to include a volume type field that holds a type value identifying the format utilized by a particular volume. It should be noted that a volinfo block is the top-level on-disk structure that points to one or more fsinfo blocks. In the illustrative embodiment, the fsinfo block is modified in accordance with the present invention. However, in alternated embodiments, the volinfo block may be modified in accordance with the teachings of the present invention. Thus, the file system, upon first accessing the volume's fsinfo block, is able to identify the appropriate volume format associated with the particular volume. During file system operations, the file system utilizes the identified volume format for determining how to interpret various file system data structures, including pointers within blocks in the file system. For example, in a conventional volume, pointers comprise vbns, whereas in a flexible (or virtual) volume in an aggregate pointers may comprise pvbn/vvbn pairs. By utilizing the identified type of volume, the storage system may interpret the pointers appropriately.

Figure 9:
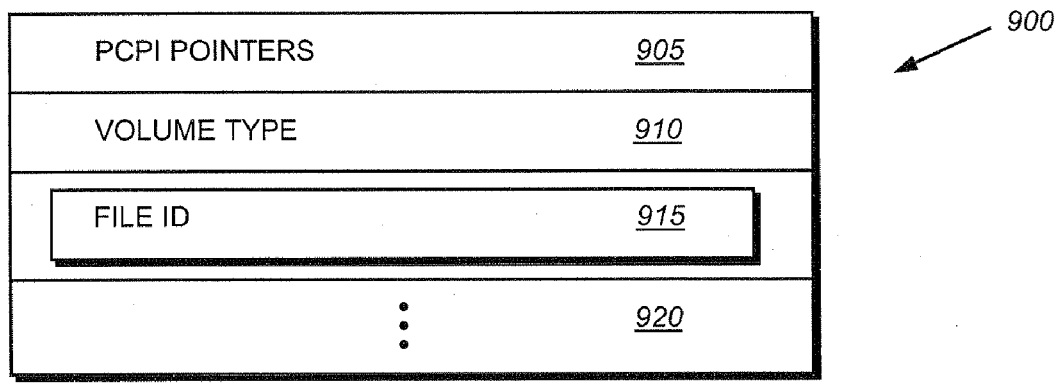
FIG. 9 is a schematic block diagram of an exemplary file system information block in accordance with an embodiment of the present invention.

FIG. 9 is a schematic block diagram of the fsinfo block on-disk structure for supporting multiple volume formats. The fsinfo block 900 includes a set of PCPI pointers 905, a volume type field 910, an inode for the inode file 915 and, in alternate embodiments, additional fields 920. The PCPI pointers 905 are pointers to PCPIs associated with the file system. The volume type field 910 identifies the type of volume described by the fsinfo block. In the illustrated embodiment, the volume type field 910 holds a type value that differentiates between a conventional volume and an aggregate comprising one or more flexible volumes contained therein. However, in alternate embodiments, the volume type field 910 may differentiate among other volume formats. As such, the description of differentiating between a conventional volume or aggregate should be taken as exemplary only. The inode for the inode file 915 includes the inode containing the root-level pointers to the inode file 860 (FIG. 8) of the file system associated with the fsinfo block. It should be noted that the inventive technique of the present invention may also be utilized with flexible volumes within an aggregate.

As noted, use of the novel volume type field enables the storage system to interpret appropriately various file system data structures contained within a volume. In the illustrative embodiment, the file system differentiates between a conventional volume and an aggregate. That is, upon identifying a conventional volume format, the file system interprets the data contained within the on-disk structures in accordance with the conventional volume model. Similarly, upon identifying a flexible volume, the file system utilizes the flexible volume/aggregate paradigm for interpreting data within the on-disk structures. For example, the file system may properly differentiate between a conventional vbn format and a flexible pvbn/vvbn pair format when traversing the buffer trees associated with the different volumes.

Figure 10:
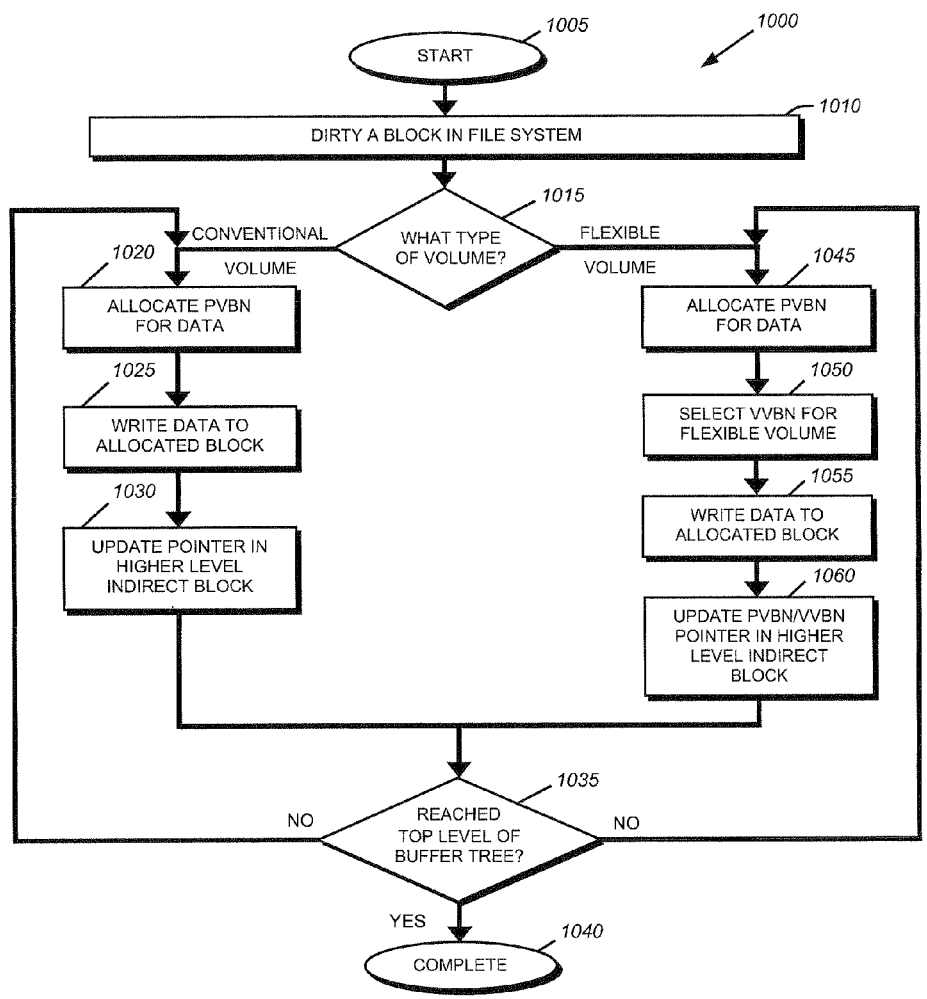
FIG. 10 is a flowchart detailing the steps of a procedure for permitting a storage system to utilize multiple volume type simultaneously in accordance with an embodiment of the present invention.

This differentiation is necessary when processing file operations directed to the volume. As the various types of volumes (conventional, aggregate, etc.) may utilize differing formats of block pointers within various on-disk structures, such as indirect blocks and/or inodes. Thus, the write allocator 382 of storage operating system 300 may interpret block pointers differently based on the type of volume being utilized. FIG. 10 is a flowchart detailing the steps of a procedure 1000 for processing dirtied blocks in a file system in accordance with an embodiment of the present invention. The procedure begins in step 1005 and continues to step 1010 where a block is dirtied in the file system. A block may be dirtied by, for example, a write operation directed to a block or by a pointer within the block being modified. In a typical environment, write operations are directed to level 0 data blocks whereas indirect blocks have pointers modified during the write operations due to a "copy-on-write" nature of the file system.

Once a block has been dirtied, the procedure continues to step 1015 where the file system determines the type of volume being utilized. This determination may be made by examining the volume type field 910 of the block 900 or, in alternate embodiments, by referencing an in-memory variable identifying the volume type. In such a latter embodiment, the in-memory variable may be configured the first time a particular volume is accessed so that for each subsequent operation the fsinfo block is not required to be loaded. If the volume type is a conventional volume, the procedure branches to step 1020, where the file system operation uses the block allocation bitmap structures to select a "free" physical block within the vbn space of the volume and then selects (allocates) a pvbn for the physical block. In step 1025, the data is written to the allocated physical block. The file system then updates the appropriate pointer in a higher level indirect block (or inode file "parent" block) of the allocated block in step 1030. This step modifies the appropriate pointer to reference the newly written block. Then, in step 1035, the file system determines if it has reached the topmost level of the buffer tree. If it has, the procedure continues to step 1040 where the data is flushed (written) to storage. If not, the procedure loops back to step 1020 and processes the next higher level of the buffer tree, which is not dirtied due to the pointer being modified in step 1030.

If, in step 1015, the file system determines that the volume is a flexible volume, the procedure branches to step 1045 where block allocation proceeds in parallel on both the flexible volume and its aggregate. Here the file system (write allocation 382) selects a pvbn in the aggregate and a vvbn in the flexible volume. Specifically the file system uses the block allocation bitmap structures to select a free physical block within the pvbn space of the aggregate (step 1045) and to select a vvbn from the vvbn space of the volume (step 1050). The data is then written to the allocated block in step 1055. The selected vvbn/pvbn pointer pair is then written to the higher level indirect block (or inode "parent" block) in step 1060. The file system then determines, in step 1035, whether it has reached the top level of the buffer tree. If so, the procedure then flushes the block(s) to disk and completes in step 1040. Otherwise, the procedure loops back to step 1045 and processes the next higher level block in the buffer tree, which is now dirtied due to step 1060.

As can be seen from procedure 1000, the use of the volume type value enables the storage operating system to support multiple volume formats simultaneously. One skilled in the art will generate that various code paths or operations may be performed for any file system operation that differs between the different volume types. Described above is the most common operation of writing a dirtied block to disk, however, it should be taken as exemplary only and should be noted that other procedures may be utilized in accordance with the teachings of the present invention.

It should be noted that the procedure 1000 is typically performed on a delayed basis, such as when the file system performs a write allocation routine to flush all dirtied data to a form of persistent storage. However, in alternate embodiments, the file system may perform procedure 1000 as a result of each dirtying block. Additionally, while the above description describes the processing of a dirtied block in accordance with an embodiment of the present invention, the teachings herein may be utilized in a wide variety of file system operations, such as when the volume formats utilized by a storage system differ. Thus, for example, when traversing a buffer tree to obtain data from a level 0 block, the file system determines the appropriate type of volume prior to interpreting the data pointers within the inode and/or indirect blocks. If the buffer tree is a conventional volume buffer tree, the pointers comprise vbns, whereas if the tree is a flexible volume buffer tree, the pointers comprise pvbn/vvbn pairs. As such, the teachings of the present invention enable a file system to effectively handle multiple volume formats simultaneously by examining the volume type field before performing any operations that require differing steps and/or interpretations of the on-disk structure between volume formats.

To again summarize, the present invention provides a system and method for enabling a storage system to support multiple volume formats simultaneously. In accordance with the illustrative embodiment, a volume type field is added to a fsinfo block associated with each of volume. The storage operating system examines the volume type field to identify the appropriate volume type of a given volume. The storage operating system may then interpret data, including pointers, within the various on-disk structures of the volume in accordance with the proper volume type.

As will be appreciated by one and skilled in the art, the principles of the president intervention may be utilized to differentiate among a plurality of differing a volume formats. As such, while this description is written in terms of differentiating between two different volume formats, it should be taken as exemplary only and not a limiting to the teachings of the present intervention. The teachings of the president intervention may be utilized with any number of file systems and and/or differing volume formats. Additionally, while this description has been written in terms of differentiating between volume formats, the principles of the present invention may be utilized in differentiating among any form of data containers including, for example file formats for other non-disk formats.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for supporting multiple volume formats by a computer storage system having a processor and a memory, comprising:
   supporting simultaneously a plurality of volumes with multiple formats stored at one or more data storage devices operatively connected to the computer storage system;
   associating a first volume type value with a first volume format of the multiple formats and associating a second volume type value with a second volume format of the multiple formats;
   examining a field from a top level of a volume of the plurality of volumes to determine whether the field comprises the first volume type value or whether the field comprises the second volume type value; and
performing a data access operation to the volume by translating a plurality of pointers of the volume in accordance with the first volume format in response to the field comprising the first volume type value, and performing the data access operation to the volume by translating the plurality of pointers of the volume in accordance with the second volume format in response to the field comprising the second volume type value.

2. The method as in claim 1, wherein the top level comprises a volume information block.

3. The method as in claim 1, wherein the top level comprises a file system information block.

4. The method as in claim 1, further comprising:
   using an electronic random access memory as at least one of the one or more data storage devices.

5. The method as in claim 1, further comprising:
   using a disk as at least one of the one or more data storage devices.

6. The method as in claim 1, further comprising:
   using a RAID array of magnetic disks as at least one of the one or more data storage devices.

7. The method as in claim 1, further comprising:
   using an array of writable storage device media as at least one of the one or more data storage devices.

8. The method as in claim 1, further comprising:
   using a DVD as at least one of the one or more data storage devices.

9. The method as in claim 1, further comprising:
   using a micro-electro mechanical memory as at least one of the one or more data storage devices.

10. A method as in claim 1, further comprising:
    in response to determining that the field comprises the second volume type value, allocating a physical volume block number to a physical block within the volume.

11. A computer storage system apparatus, comprising:
    a computer storage system configured to store a plurality of volumes with multiple formats on one or more data storage devices of the computer storage system;
    a processor of the computer storage system configured to execute a storage operating system, the storage operating system configured to examine a field from a top level data structure of a volume of the plurality of volumes to determine whether the field comprises a first volume type value associated with a first volume format of the multiple formats or whether the field comprises a second volume type value associated with a second volume format of the multiple formats; and
    the storage operating system further configured to interpret a plurality of pointers of the volume in accordance with the first volume format in response to the field comprising the first volume type value, and further configured to interpret the plurality of pointers of the volume in accordance with the second volume format in response to the field comprising the second volume type value.

12. The apparatus as in claim 11, wherein the top level data structure comprises a volume information block.

13. The apparatus as in claim 11, wherein the top level data structure comprises a file system information block.

14. The apparatus as in claim 11, further comprising:
    an electronic random access memory used as at least one of the one or more data storage devices.

15. The apparatus as in claim 11, further comprising:
    a disk used as at least one of the one or more data storage devices.

16. The apparatus as in claim 11, further comprising:
    a RAID array of magnetic disks used as at least one of the one or more data storage devices.

17. The apparatus as in claim 11, further comprising:
    using an array of writable data storage device media as at least one of the one or more data storage devices.

18. The apparatus as in claim 11, further comprising:
    using a DVD as at least one of the one or more data storage devices.

19. The apparatus as in claim 11, further comprising:
    using a micro-electro mechanical memory as at least one of the one or more data storage devices.

20. An apparatus as in claim 11, further comprising:
    in response to determining that the field comprises the second volume type value, the storage operating system further configured to allocate a physical volume block number to a physical block within the volume.

21. A computer readable storage media containing executable program instructions to be executed by a processor, the computer readable storage media comprising:
    program instructions that support a plurality of volumes with multiple formats stored at one or more data storage devices of a computer storage system;
    program instructions that associate a first volume type value with a first volume format of the multiple formats and program instructions that associate a second volume type value with a second volume format of the multiple formats;
    program instructions that examine a field from a top level of a volume of the plurality of volumes to determine whether the field comprises the first volume type value or whether the field comprises the second volume type value; and
    program instructions that perform a data access operation to the volume by interpreting a plurality of pointers of the volume in accordance with the first volume format in response to the field comprising the first volume type value, and program instructions that perform the data access operation to the volume by interpreting the plurality of pointers of the volume in accordance with the second volume format in response to the field comprising the second volume type value.

22. The method as in claim 1, wherein the first volume format comprises a flexible volume format.

23. The method as in claim 1, wherein the second volume format comprises a conventional volume format.

24. The method as in claim 1, wherein examining the field comprises examining the field when the volume is mounted on the computer storage system.

25. The apparatus as in claim 11, further comprising:
a memory of the computer storage system, wherein the storage operating system is further configured to reference the memory to determine how to interpret the plurality of pointers.

26. The apparatus as in claim 11, wherein the first volume format comprises a flexible volume format.

27. The apparatus as in claim 11, wherein the second volume format comprises a conventional volume format.

28. The apparatus as in claim 11, wherein the storage operating system is further configured to differentiate between a conventional volume block number format and a flexible physical volume block number, virtual volume block number (pvbn/vvbn) pair format when traversing a buffer tree associated with the volume to interpret the plurality of pointers.

29. The apparatus as in claim 11, wherein at least one of the plurality of pointers comprises a physical volume block number to virtual volume block number mapping pair.

* * * * *

UNITED STATES PATENT AND TRADEMARK OFFICE
CERTIFICATE OF CORRECTION

PATENT NO. : 8,126,935 B2  Page 1 of 1
APPLICATION NO. : 12/535256
DATED : February 28, 2012
INVENTOR(S) : David Hitz et al.

It is certified that error appears in the above-identified patent and that said Letters Patent is hereby corrected as shown below:

Col. 6, line 37 should read: "ured to execute applications ~~112~~ 212. Moreover, the client 210"

Signed and Sealed this
Fifteenth Day of May, 2012

David J. Kappos
*Director of the United States Patent and Trademark Office*